Inventors
Charles H. Thompson
and Coleman B. Moore,
By J. T. Wobensmith
Attorney.

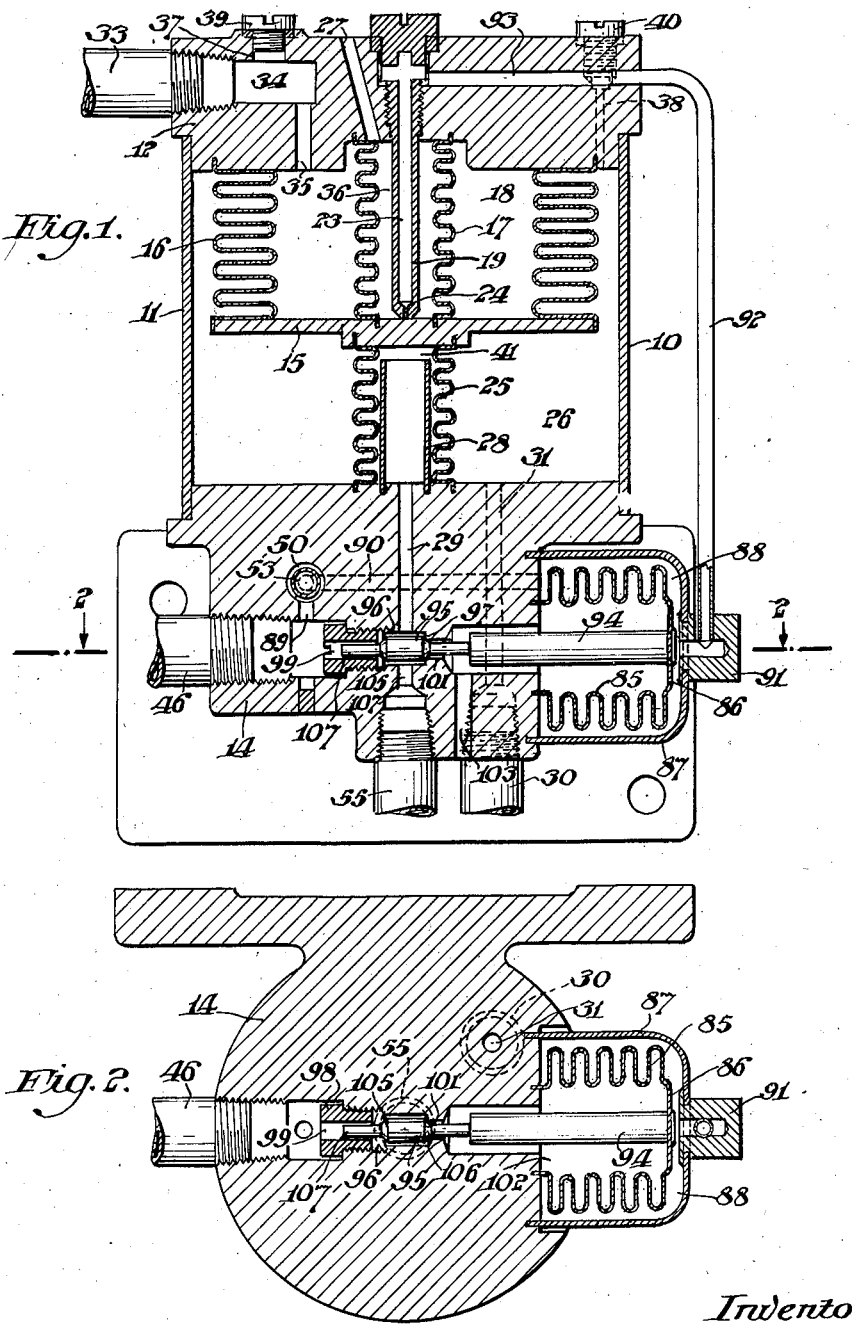

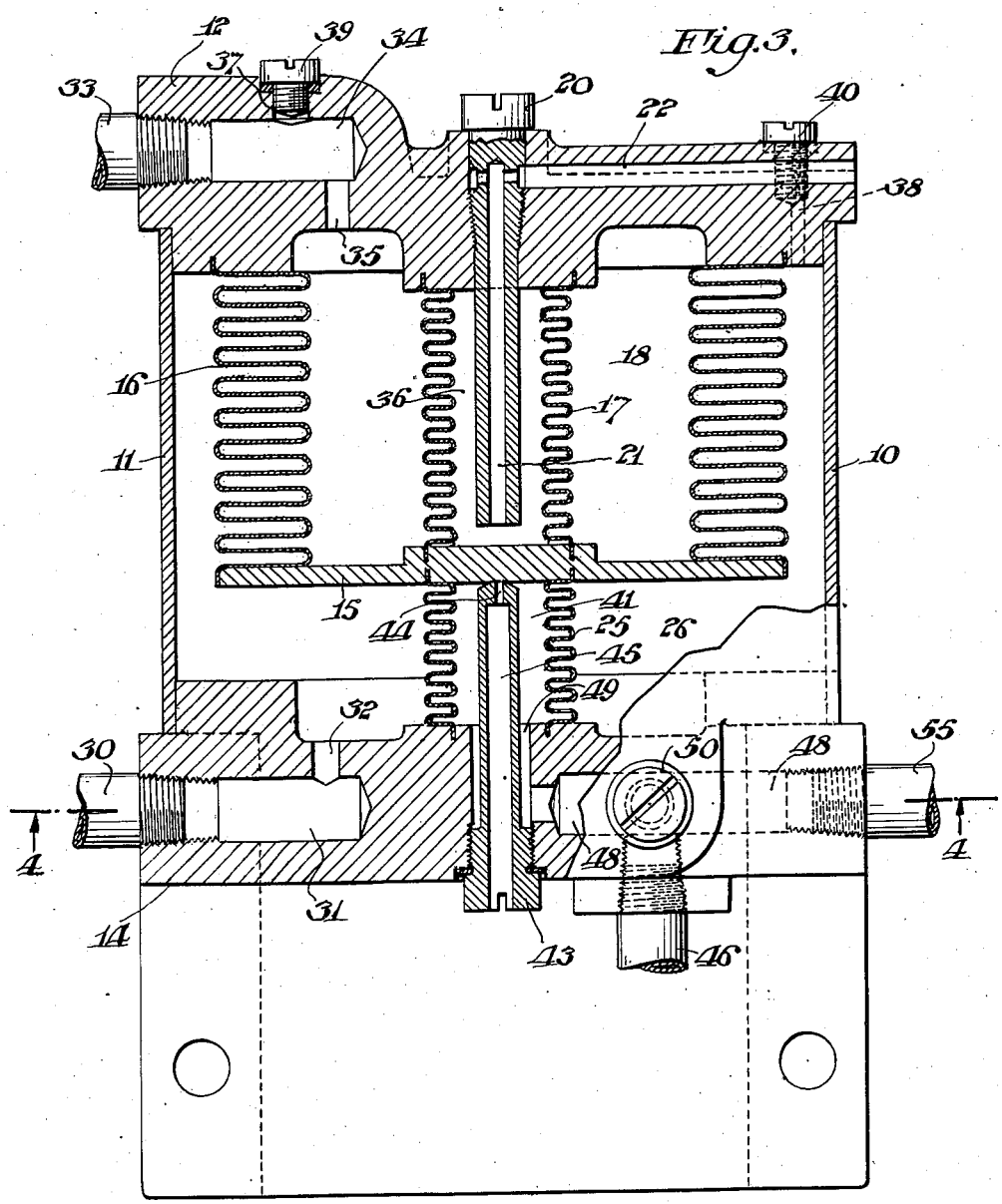

Inventors
Charles H. Thompson
and Coleman B. Moore
By J. T. Wobensmith
Attorney.

Patented Feb. 23, 1943

2,312,201

UNITED STATES PATENT OFFICE 2,312,201

PRESSURE TRANSMITTER

Charles H. Thompson, Huntingdon Valley, and Coleman B. Moore, Carroll Park, Pa.

Application February 12, 1941, Serial No. 378,590

10 Claims. (Cl. 137—153)

This invention relates to pressure transmission units, and more particularly to a pressure transmission unit of the pneumatic type.

It is the principal object of the present invention to provide an improved form of a pressure transmission unit suitable for use for purposes of indication, recording or control.

It is a further object of the present invention to provide a differential pressure responsive unit which will have a wide range of usefulness in its various applications.

It is a further object of the present invention to provide a unit responsive to pressure differentials with provisions for rebalancing.

It is a further object of the present invention to provide a differential pressure responsive unit with provisions for multiplying the resultant of the differential pressure.

It is a further object of the present invention to provide a pressure transmission unit in which the total motion of the movable parts, after rebalancing, is reduced to a minimum so that the linear characteristics of the transmitted pressure are unaffected by the structure.

Other objects of the invention will be apparent from the annexed specification and claims.

The nature and characteristic features of the invention will be more readily understood from the following description, taken in connection with the accompanying drawings forming part hereof, in which:

Figure 1 is a vertical central sectional view of a preferred embodiment of a pneumatic differential pressure responsive transmission unit constructed in accordance with the present invention and provided with a pilot valve as an integral part thereof;

Fig. 2 is a horizontal sectional view taken approximately on the line 2—2 of Fig. 1;

Fig. 3 is a vertical central sectional view of another preferred embodiment of the pneumatic differential pressure responsive transmission unit of the present invention for use where a pilot valve is not required, parts being shown in elevation;

Figure 4:
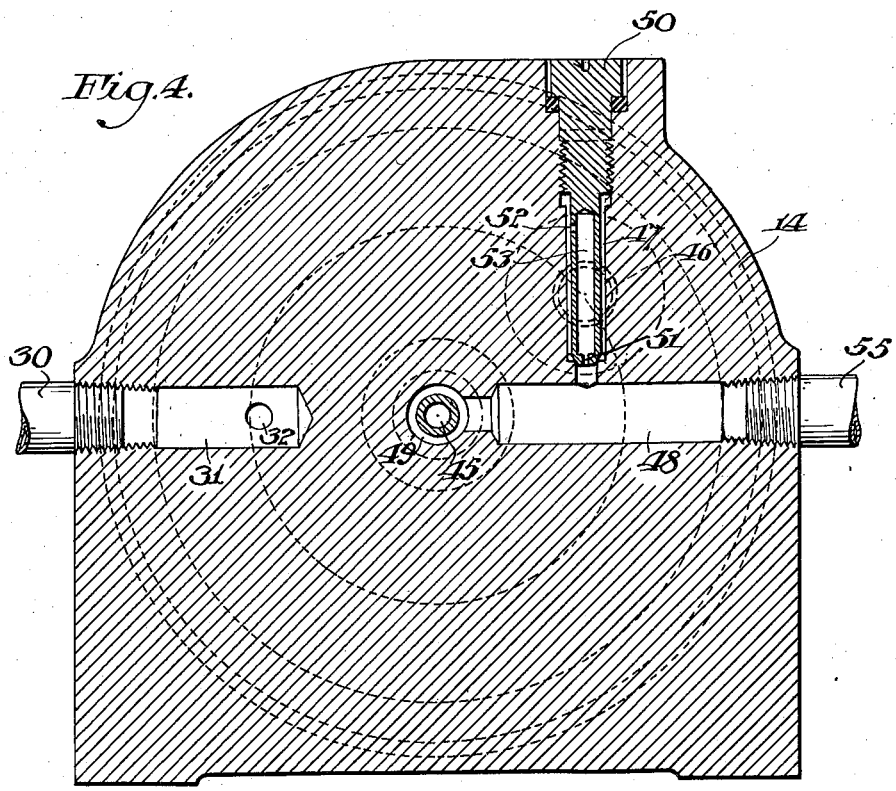
Fig. 4 is a horizontal sectional view taken approximately on the line 4—4 of Fig. 3.

It will, of course, be understood that the description and drawings herein are illustrative merely, and that various modifications and changes may be made in the structure disclosed without departing from the spirit of the invention.

Referring more particularly to Figs. 1 and 2 of the drawings, the embodiment of the pneumatic differential pressure responsive unit is there illustrated generally at 10. The unit 10 preferably includes an external side wall portion 11, an upper supporting end wall portion 12 and a lower supporting end wall portion 14, the supporting end wall portions 12 and 14 being secured to the side wall portion 11 at the ends thereof with fluid-tight joints and the whole being made of suitable strength to withstand the pressures to which the unit is subjected in use. While the unit 10 is shown as located in a particular position, it is not limited in its operation to this position.

Intermediate the supporting end wall portions 12 and 14 a flat metallic bellows end plate member 15 is provided and has secured thereto at the outer edge in fluid-tight relationship a flexible or extensible metallic bellows 16 which is connected to the bellows plate member 15 and extends therefrom to the supporting end wall portion 12 and is secured to the end wall portion 12 in fluid-tight relationship.

A flexible or extensible metallic bellows 17 of smaller diameter than the bellows 16 is provided and is secured to the bellows plate 15 in fluid-tight relationship and also extends from the bellows plate 15 to the supporting end wall portion 12 to which it is likewise secured in fluid-tight relationship. A fluid pressure chamber 18 is thus provided in the space between the bellows plate 15 and the end wall portion 12 and between the bellows 16 and the bellows 17. An effective area $a_1$ is available on the bellows plate 15 for the action of fluid under pressure within the chamber 18.

The end wall portion 12 has mounted therein a nozzle member 19 which is preferably adjustably mounted in the end wall portion 12 and extends to but is spaced a very short predetermined distance from the bellows plate member 15. The nozzle member 19 has an interior body portion 23 which is in communication with the chamber 36 within the bellows 17 through a discharge port 24. The quantity of fluid passing through the discharge port 24 will be determined by the location, for a given set of pressure conditions, of the bellows plate member 15 with respect to the discharge port 24, as hereinafter more fully set forth. A passageway 27 is provided in the end wall 12 for venting the interior of the chamber 36 within the bellows 17 to the atmosphere and so that the pressure within the chamber 36 will be atmospheric.

A metallic bellows 25 is also provided, of the same diameter as the metallic bellows 17, and is secured to the bellows plate member 15 in fluid-tight relationship. The bellows 25 extends from the plate 15 to the end wall 14 to which it is likewise secured in fluid-tight relationship.

The space within the side wall 11 and between the end walls 12 and 14 and outside the bellows 16 and the bellows 25 provides a fluid pressure chamber 26 and an effective area $a_1$ is available on the bellows end plate 15 for the action of fluid under pressure within the chamber 26.

A fluid connection 30 is provided for introducing fluid under pressure to the chamber 26. This fluid connection preferably includes a suitable passageway 31 provided in the end member 14. The fluid may, of course, be a liquid, such as water, or may be a gas, such as air or steam. The pressure of this fluid will be referred to as a "lower pressure" and identified as $p_2$.

A fluid connection 33 is also provided for introducing fluid under pressure to the chamber 18. This fluid connection preferably includes passageways 34 and 35 provided in the end portion 12. This fluid may also be a liquid or a gas, in accordance with the use which is made of the pneumatic unit. The pressure of this fluid will be referred to as a "higher pressure" and identified as $p_1$.

The upper end wall portion 12 is preferably also provided with a plurality of vents 37 and 38 in communication respectively with the chambers 18 and 26, the vents being closed by suitable screw plugs 39 and 40 and providing for initially filling the chambers 18 and 26 with liquid when liquid is employed in the instrument.

The space within the bellows 25 provides a fluid pressure chamber 41 and an effective area $a_2$ is available on the bellows plate 15 in accordance with the size of the bellows 25 and 17 for the action of fluid under pressure within the chamber 41.

The effective areas $a_1$ and $a_2$ on the bellows plate 15 are preferably proportioned, by the selection of bellows of suitable size and with the desired internal and external diameters, to provide the desired ratio of amplification of the pressure differential which is effective on the bellows plate 15. For example, if the effective areas $a_1$ and $a_2$ are in the ratio of 20 to 1 an amplification of 20 to 1 of the pressure differential will be obtained as hereinafter referred to.

The end wall portion 14 preferably has mounted therein an overload stop member 28 which extends longitudinally within the bellows 25 and is terminated a short distance from the bellows plate member 15 for limiting the movement thereof. The stop member 28 is preferably in the form of a tube and the interior thereof has a supply or pressure equalizing passageway 29 extending therefrom to the pilot valve mechanism to provide for communication therewith, as hereinafter more fully pointed out.

A supply conduit 46 is provided and is connected to the end wall portion 14, and a filtered and pressure regulated supply or source of fluid, preferably air, is connected thereto. The pressure of the supply, which may be selected to suit the particular requirements, will be referred to as $p_3$.

Any desired pilot valve mechanism may be employed in connection with the instrument. The pilot valve mechanism hereinafter set forth is suited for the purpose of transmitting the desired measure of differential pressure in terms of fluid pressure for utilization at a remote location. The pilot valve mechanism may be provided within the end wall portion 14 and includes a flexible metallic bellows 85 secured at one end thereof in fluid-tight relationship in the end wall portion 14 and having a movable end wall 86. A casing 87, also mounted in fluid-tight relationship on the end wall portion 14, encloses the bellows to provide a fluid pressure chamber 88 outside the bellows 85. The chamber 88 is supplied with air from the supply conduit 46 through a passageway 89 and a passageway 90. A flow control member 50, shown in more detail in Fig. 4, is mounted in the end wall portion for restricting and controlling the quantity and pressure of fluid supplied from the supply conduit and through the passageways 89 and 90 to the chamber 88.

The flow control member 50 has a constriction or orifice 51, and the constriction or orifice 51 is preferably of smaller size than the discharge port 24, to permit of a drop in the pressure beyond the orifice 51 of the fluid supplied from the source.

The chamber 88 is in communication with the nozzle member 19 through a connector 91 mounted in the wall of the casing 87, a conduit 92 extending to the end member 12 and a passageway 93 in the end member 12 in communication with the interior portion 23 of the nozzle member 19.

The movable end wall 86 of the bellows 85 has a pilot valve actuating rod 94 connected thereto for actuating the pilot valve 95 upon a change in the pressure in the chamber 88.

The pilot valve mechanism includes a pilot valve chamber 96 which has a fixed seat 97 at one end thereof and has a removable seat member 98 at the other end thereof. The removable valve seat member 98 has a fluid passageway and guide portion 99 therethrough and provides for communication between the supply conduit 46 and the pilot valve chamber 96 and supplying of fluid to the pilot valve chamber 96 in accordance with the positioning of the pilot valve 95. A passageway 101 extends from the valve chamber 96 to the space 102 adjacent the bellows 85 for the controlled discharge of fluid from the pilot valve chamber 96 in accordance with the positioning of the pilot valve 95. An exhaust port 103 is provided in communication with the space 102 and with the atmosphere for discharge of fluid delivered through the passageway 101, and for maintaining atmospheric pressure in the space 102.

The pilot valve member 95, which is actuated by the valve rod 94, has spaced seating portions 105 and 106. The seating portion 105 of the pilot valve 95 is adapted to be moved to the proper position with respect to the valve seat 98 to provide the desired control by throttling or cutting off the flow through the passageway 99 in accordance with the positioning of the valve 95. The valve 95 is guided and supported by the movement of the end portion 107 in the guide portion 99. The seating portion 106 of the valve 95 is, at the same time, moved to the proper position with respect to the valve seat portion 97 to provide for the controlled and throttled discharge of fluid through the passageway 101.

The pressure prevailing in the valve chamber 96 will be determined by the positioning of the pilot valve 95 which controls the flow into and out of that chamber.

An instrument connection 55 is provided and is in communication with the pilot valve chamber 96 through the passageway 107 and additionally with the chamber 41 through the passageway 29 which extends from the pilot valve chamber 96 to the chamber 41.

A fluid pressure responsive indicating, recording or control mechanism M is connected to the instrument connection 55, and the form of the invention shown in Figs. 1 and 2 is particularly suitable where it is desired to locate this mechanism remote from the unit 10 since it provides an ample quantity of fluid at the instrument connection 55 for distant operation. If indication or recording is desired, the mechanism may take the form of an indicating or recording instrument, and if control is desired, this mechanism may take the form of pressure responsive or pressure controlled mechanism.

The pressure transmitted through the instrument connection 55 will, upon balancing, be a static pressure and will be the pressure utilized for rebalancing and prevailing in the chamber 41. This pressure will be referred to as the metering pressure and identified as $p_4$.

The form of the invention illustrated in Figs. 3 and 4 is similar to that illustrated in Figs. 1 and 2 and includes the provision of the side wall portion 11, the end wall portions 12 and 14, the bellows 16 and 17, the bellows plate member 15 and the bellows 25. The fluid connection 30 is provided for introducing fluid under pressure to the chamber 26 and includes passageways 31 and 32 in the end member 14. The fluid connection 33 is also provided for introducing fluid under pressure to the chamber 18 and includes passageways 34 and 35 provided in the end portion 12.

The end wall portion 12 preferably has mounted therein a removable overload stop member 20 which extends longitudinally within the bellows 17 and is terminated a short distance from the bellows plate member 15 for limiting the movement thereof. The stop member 20 has a central opening 21 therethrough in communication with an opening 22 in the end wall portion 12 to provide for communication of the chamber 36 in the interior of the bellows 17 with the atmosphere and so that the pressure within the chamber 36 will be atmospheric.

A nozzle member 43 is provided within the chamber 41 and is preferably adjustably mounted in the end wall portion 14 and extends to but is spaced a very short predetermined distance from the bellows plate 15 and within the chamber 41. The nozzle member 43 has a discharge port 44 which is in communication with the atmosphere through the open interior body 45 of the nozzle member 43. The quantity of fluid passing through the discharge port 44 will be determined by the location, for a given set of pressure conditions, of the bellows plate 15 with respect to the discharge port 44, as hereinafter more fully set forth.

The supply conduit 46 is provided and is connected to the end wall portion 14, a filtered and pressure regulated supply or source of fluid, preferably air, being connected thereto. Suitable passageways 47, 48 and 49 are provided in the end wall portion 14 to provide for communication between the supply conduit 46 and the chamber 41 and the flow control member 50 is mounted in the end wall portion 14.

The instrument connection 55 is provided and is in communication with the chamber 41 through the passageways 48 and 49. A fluid pressure responsive indicating, recording or control mechanism M is directly connected to the instrument connection 55 in accordance with the specific use which is made of the pneumatic unit. If indication or recording is desired, the mechanism may take the form of an indicating or recording instrument and if control is desired, this mechanism may take the form of a pressure responsive or pressure controlled mechanism.

The pressure transmitted through the instrument connection 55 will, upon balancing, be a static pressure and will be the pressure prevailing in the chamber 41. This metering pressure will be referred to and identified as $p_4$.

The operation of the pneumatic unit will now be pointed out, attention first being given to the features common to the different forms of the invention herein illustrated. The pressure $p_1$ will be available through the conduit 33 and in the chamber 18 and upon the effective area $a_1$ of the plate member 15 in one direction. The pressure $p_2$ will be available through the conduit 30 and in the chamber 26 and upon the same effective area $a_1$ of the plate member 15 in the opposite direction. Fluid under pressure is supplied, in the manner hereinafter pointed out, to the chamber 41 and upon the effective area $a_2$ of the plate member 15 in the same direction as the pressure $p_2$. The pressure of the fluid in the chamber 41 is utilized for rebalancing. The fluid in the chamber 41 will have the effect on the portion of the plate member 15 on which this pressure fluid is effective, i. e., the effective area $a_2$, of counterbalancing the difference between the pressures $p_1$ and $p_2$ exerted on the end plate member 15 by the fluids in the chambers 18 and 26.

Upon an increase in the differential of the pressures $p_1$ and $p_2$ there will be a tendency to compress the bellows 25 and extend the bellows 16 and 17 by reason of the preponderance of the force exerted by the fluid under the pressure $p_1$. When this occurs, the plate member 15 will be initially moved in response to the change to a position so as to change the permissible flow of air through the discharge ports 24 or 44 of the nozzles 19 or 43. As hereinafter pointed out, an increase in the pressure in the chamber 41 is effected and this moves the plate member 15 to a new equilibrium position so that a new balancing or metering pressure is effective within the chamber 41, and this pressure is available at the instrument connection 55 for transmission.

The force effective in the chamber 41 and acting on the plate member 15 will be the product of the metering pressure $p_4$ and the effective area upon which this pressure acts. From this it will be seen that the rebalancing is proportionate to the respective sizes of the areas $a_1$ and $a_2$ and by suitably proportioning the area $a_2$ with respect to the area $a_1$ the metering pressure $p_4$ and the changes thereof will be multiples of the differential pressure $(p_1-p_2)$ and the changes thereof so that a wide range of amplification is available independently of the use of the pilot valve mechanism.

Upon a decrease in the differential pressure the plate member 15 will be initially impelled in the opposite direction and so as to compress the bellows 16 and 17 and extend the bellows 25 and again vary the permissible flow of air through the discharge port 24 or 44 of the nozzle 19 or 43. The pressure in the chamber 41 will be caused to decrease to a new equilibrium and the plate member 15 will take a new equilibrium position in accordance with the resultant of the pressures acting thereupon. The pressure $p_4$ in the chamber 41 will be available for transmission as hereinafter pointed out.

The control of the supply of the fluid to the chamber 41 for rebalancing differs somewhat in the two forms of the invention.

In the form of the invention illustrated in Figs. 1 and 2, the control of the pressure of the fluid supplied to the chamber 41 is effected through the control of the pilot valve 95. Fluid is supplied at the supply connection 46 and a portion passes through the passageway 89, through the control member 50 with its constriction or orifice 51, and through the passageway 90 to the chamber 88 where it is effective on the bellows 85 in that chamber. The fluid also passes from the chamber 88 through the connector 91, the conduit 92, the passageway 93 in the end member 12 and through the interior portion 23 of the nozzle member 19 to the discharge port 24. The flow through the discharge port 24 is determined by the positioning, for a given set of differential pressure conditions, of the plate member 15 with respect to the discharge port 24. If the flow through the discharge port 24 is reduced, the pressure back through the nozzle 19, and its connections to the chamber 88, and in the chamber 88 will increase and the force thereof will be effective to compress the bellows 85. Pressure fluid will also be supplied to the valve chamber 96 through the passageway 99 in the valve seat member 98, in accordance with the positioning of the pilot valve 95, and will be discharged through the passageway 101 and through the space 102 and the exhaust passageway 103 to the atmosphere, also in accordance with the positioning of the pilot valve 95.

The pressure of the fluid in the pilot valve chamber 96 will be effective through the passageway 29 and in the chamber 41 and will be available against the effective area $a_2$ on the plate member 15.

Upon an increase in the differential pressure, the bellows plate 15 will tend to move downwardly. This will permit more fluid to escape through the discharge port 24 and will cause a drop in pressure which will be effective within the bellows chamber 88. Upon a drop in the pressure within the chamber 88, the bellows 85 will expand and the pilot valve 95 will be actuated towards the right as illustrated. This movement of the pilot valve 95 will admit air at increased pressure to the pilot valve chamber 96 and therefrom to the chamber 41 and decrease the discharge of air from the pilot valve chamber 96. The increase in pressure in the chamber 41 will be effective for moving the bellows plate member 15 with respect to the discharge port 24 until equilibrium pressure conditions are attained. The bellows plate 15 will thus be returned to a new rebalancing position.

Upon a decrease of the differential pressure, the bellows plate 15 will tend to move upwardly and this will decrease the discharge of air through the discharge port 24 and will cause an increase in the pressure within the chamber 88. The pilot valve 95 will be actuated to throttle the air entering through the passageway 99 and increase the discharge from the pilot valve chamber 96 so that a reduced pressure will be effective for rebalancing in the chamber 41 and a new set of equilibrium conditions will be attained.

The pressure prevailing in the chamber 41 upon rebalancing will be available at the instrument connection 55 for indication, recording or control, as desired.

In the form of the invention illustrated in Figs. 3 and 4, upon an increase in the differential of the pressures $p_1$ and $p_2$, the bellows plate member 15 will be initially moved to a position so as to reduce the permissible flow of fluid through the discharge port 44, or even to a position to close off the escape of air through the discharge port 44. The pressure in the chamber 41 will increase and move the bellows plate member 15 to a new equilibrium position so that a new metering pressure is effective within the chamber 41. The venting of the chamber 41 will continue. This metering pressure will be transmitted through the passageways 49 and 48 and the instrument connection 55 to the indicating, recording or control mechanism.

Upon a decrease in the differential pressure, the bellows plate member 15 will be initially moved in a direction away from the nozzle 43 and increase the permissible flow of air through the discharge port 44. The pressure in the chamber 41 will decrease to a new equilibrium and the bellows plate member 15 will take a new equilibrium position in accordance with the resultant of the pressures acting thereupon. The pressure $p_4$ in the chamber 41 will be transmitted through the passageways 49 and 48 and the instrument connection 55 to the indicating, recording or control mechanism as before.

The rebalancing by the use of the air pressure in the chamber 41 permits of attaining equilibrium conditions with a very small total range of movement of the bellows plate member 15 and of the order of a few thousandths of an inch, and this may be accomplished with a very wide range of pressure differentials. Since the bellows plate member 15 is responsive to very slight changes in pressure, and since by the rebalancing the bellows plate member is returned substantially to its initial position, any non-linear effect of the bellows is rendered negligible.

From the foregoing it will be clear that with the pneumatic unit of the present invention differential pressures, as a medium for ascertaining changes of condition, may be translated and transmitted in terms of a variable transmitted static pressure of a fluid, amplified as desired, and this transmitted variable fluid pressure is available either directly or through a suitable pilot valve for purposes of indication, recording or control. Specific instances of installations in which the pneumatic unit may be employed will now be set forth.

Figure 5:
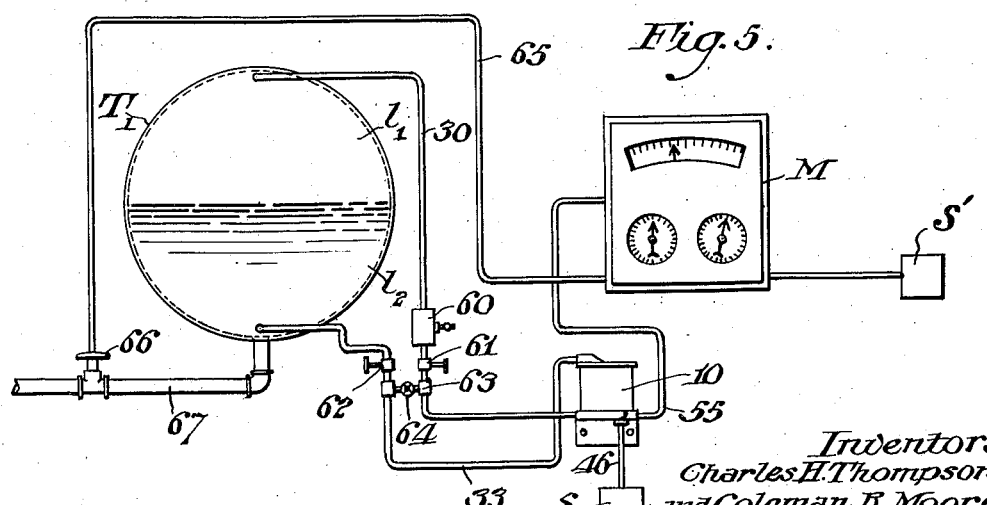
Fig. 5 is a diagrammatic view illustrating one mode of use of the pneumatic unit of the present invention.

In Fig. 5, the pneumatic unit 10 is illustrated in one mode of use for liquid level indication, recording or control. A container or tank $T_1$ is provided in which two liquids $l_1$ and $l_2$ of different specific gravities are provided, the liquids being in face to face contact. The conduit 30 is connected to the upper portion of the container $T_1$ and above the contact faces and the conduit 33 to the lower portion and below the contact faces of the liquids. The conduits 30 and 33 are respectively connected to the pneumatic unit. The conduit 30 may have a liquid seal 60 and may also have a valve 61 for shutting off communication, if desired. The conduit 33 may also have a valve 62 therein for shutting off communication. A cross connection 63 with a valve 64 therein may be provided between the conduits 30 and 33, for pressure equalization. A source S of pressure regulated and filtered air is connected to the conduit 46, and the instrument connection 65 may be connected to a suitable mechanism M for indication or recording. The mechanism M may, in turn, be connected for transmitting fluid under pressure from a source S', and controlled by the mechanism M, to a control valve 66 for regulating the flow through a pipe 67 connected to the container T1 and controlling the flow of liquid through the conduit 67 in accordance with the face to face level changes. The differential pressure in the conduits 30 and 33 will be effective through these conduits and upon the end plate member 15 of the pneumatic unit 10. The differential pressure will vary in accordance with the variation of the face to face level of the liquids $l_1$ and $l_2$. The successive differential pressures will be translated by the pneumatic unit 10 and transmitted as changes in the metering pressure of the fluid which may be utilized for the desired indication, recording or control of the face to face liquid level.

Figure 6:
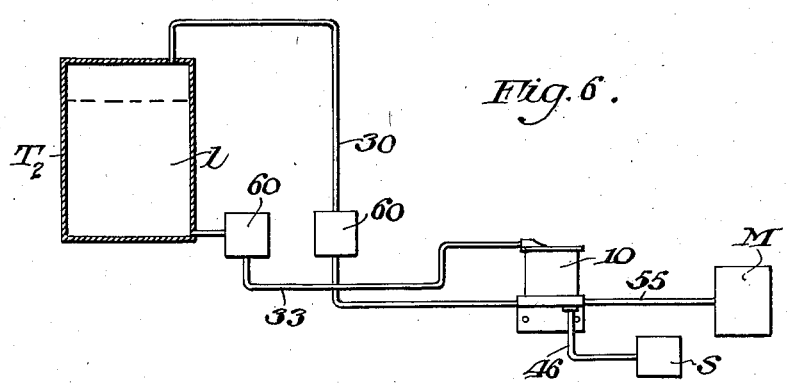
Fig. 6 is a diagrammatic view illustrating the use of the pneumatic unit of the present invention for liquid level indication, recording or control.

In Fig. 6, the unit 10 is shown connected for liquid level indication, recording or control. The conduit 30 is connected to the tank T2 in which the liquid 1 is contained, above the level of the liquid, and may be connected through a liquid seal 69 to the pneumatic unit 10. The tank is also connected, below the level of the liquid, by a conduit 33, which may have a liquid seal 60 therein, to the pneumatic unit 10. The unit 10 also has connected thereto the source S of pressure regulated and filtered air and the mechanism M for indication, recording or control as desired. Upon a change of the level of the liquid in the tank T2, the pressures will be transmitted through the conduits to the end plate member 15 and the differential pressure effective on the end plate member 15 will vary in accordance with the level of the liquid in the tank T2. As the level changes the successive differential pressure changes will be translated by the pneumatic unit 10 and transmitted as amplified changes in the metering pressure $p_4$, which pressure may be utilized at the mechanism M for the desired indication, recording or control of the liquid level in the tank T2.

Figure 7:
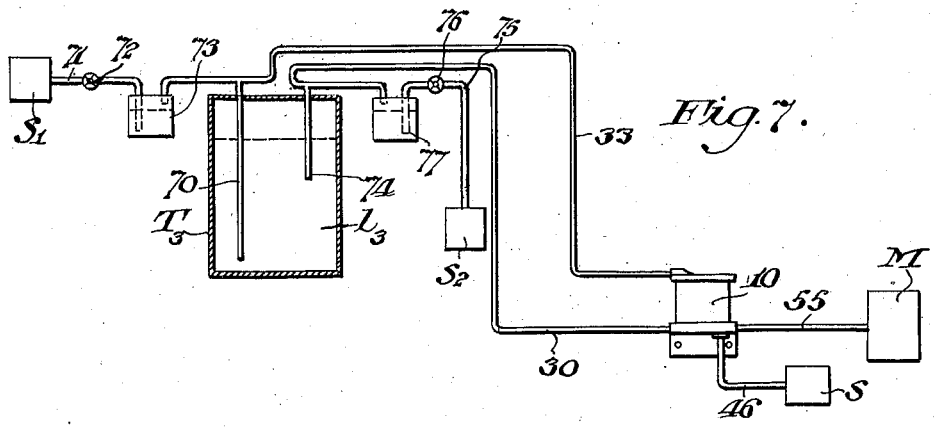
Fig. 7 is a diagrammatic view illustrating the manner of use of the pneumatic unit of the present invention for specific gravity indication, recording or control.

In Fig. 7, the pneumatic unit 10 is shown as connected for the determination of the specific gravity or density of a corrosive liquid in the tank T3 for indication, recording or control. Changes in the specific gravity or density of the liquid in the tank T3 will effect corresponding changes in the differential of the pressures at two vertically spaced locations within the liquid $l_3$. For the purpose of ascertaining the pressure at one point in the liquid, a bubbling tube 70 is provided which extends downwardly through the liquid in the tank T3. Gaseous fluid, such as air, under pressure is supplied from a source S1 through a pipe 71, preferably having an adjustable restriction or valve 72 therein for controlling the flow, and through a bubbling bottle 73 and the gaseous fluid from the bubbling bottle 73 is permitted to bubble through the lower end of the tube 70. The pressure transmitted through the conduit 33 is thus a measure of the pressure at the lower end of the tube 70. Another bubbling tube 74 is also provided terminating at a different level within the liquid $l_3$ and above the lower end of the tube 70. Gaseous fluid, such as air, under pressure, is supplied from a source S2 through a conduit 75 which preferably has an adjustable restriction or orifice 76 therein for controlling the flow and through a bubbling bottle 77. The pressure transmitted through the conduit 30, when air supplied through the bubbling bottle 77 flows through the bubbling tube 74, is a measure of the pressure at the lower end of the bubbling tube 74. The differential of the pressures in the conduits 33 and 30 may thus be translated by the pneumatic unit 10 and the transmitted pressure will serve as a measure of the specific gravity or density of the liquid in the tank. This measure of the specific gravity or density may then be indicated, recorded or controlled as desired by the mechanism M.

Figure 8:
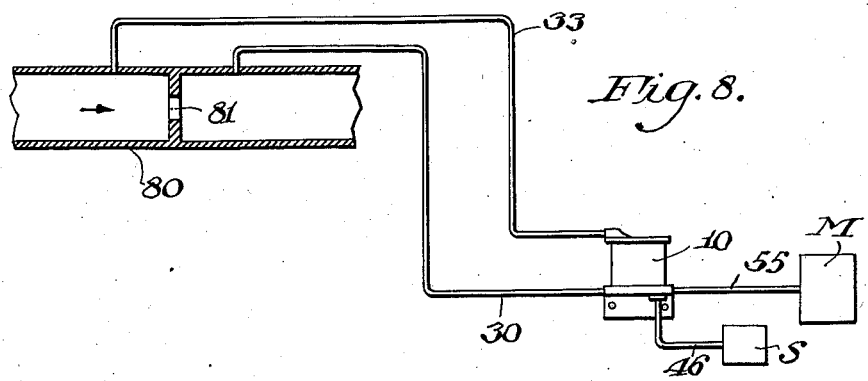
Fig. 8 is a diagrammatic view illustrating the manner of use of the pneumatic unit of the present invention for fluid flow indication, recording or control.

The pneumatic unit 10 may also be utilized for flow control or flow indication as illustrated in Fig. 8. A conduit 80 through which the fluid to be measured is flowing is provided with any desired type of orifice 81, the conduits 33 and 30 being respectively connected to the up-stream and down-stream side of the orifice 81. The unit 10 also has the source or supply S of pressure regulated and filtered air connected thereto by the conduit 46. The differential pressure may thus be translated and transmitted with the pneumatic unit 10 of the present invention for indication, recording or control by the mechanism M.

We claim:

1. A fluid pressure responsive mechanism including an enclosing casing, a movable plate member within said casing and connected thereto by an extensible wall, said movable member having a flat pressure control surface, means for applying fluid pressure against one face of said movable member and inside said extensible wall, means for applying fluid pressure against a corresponding area on the other face of said movable member and outside said extensible wall, and balancing means for applying a balancing fluid pressure against another face portion of said movable member for balancing the difference of the pressure applied by said other means, said balancing means including a balancing chamber bounded in part by said movable member, a pilot valve for controlling the supplying of fluid to and exhaust from said balancing chamber, and means for positioning said pilot valve including a discharge member fixed with respect to said casing and having a discharge port controlled by the spacing with respect thereto of said control surface.

2. A fluid pressure responsive mechanism including an enclosing casing, a movable member within said casing responsive to differential pressure, and balancing means for applying a balancing fluid pressure against said movable member for balancing the difference of the pressure applied thereto, said balancing means including an expansible balancing chamber bounded by said movable member, a pilot valve for controlling the pressure conditions in said chamber, and fluid pressure responsive means for positioning said pilot valve, said last means including a discharge member having a discharge port controlled by the spacing of said movable member with respect thereto.

3. A fluid pressure mechanism including a chamber having a flexible wall and a movable pressure responsive closure wall, a source of fluid under pressure, inlet means having a flow restricting member therein for supplying fluid from said source to said chamber, means for controlling the discharge of fluid from said chamber including a pressure control element for said chamber fixedly mounted with respect to said chamber and having a discharge port, said closure wall directly controlling the discharge through said discharge port by its positioning with respect to said discharge port.

4. A fluid pressure mechanism including a chamber having a flexible wall and a movable pressure responsive closure wall, said closure wall having a pressure control surface, a source of fluid under pressure, inlet means having a flow restricting member therein for supplying fluid from said source to said chamber, means for controlling the discharge of fluid from said chamber including a pressure control element fixedly mounted with respect to said chamber and having a discharge port closely adjacent the control surface of said closure wall, the flow through said discharge port being controlled by the positioning of the closure wall with respect to said discharge port.

5. A fluid pressure responsive unit including a casing, a movable member within said casing, a metallic bellows connected to said casing and to said movable member to provide a static pressure chamber outside said bellows, a second metallic bellows within said first metallic bellows and connected to said casing and said movable member to provide another static pressure chamber within said first metallic bellows, a third metallic bellows connected to said movable member and to said casing and disposed on the opposite side of said movable member from said second metallic bellows, said second and said third metallic bellows having the same effective area with respect to said movable member whereby said static pressure chambers have equal areas with respect to said movable member, the space within said third bellows providing a rebalancing pressure chamber for rebalancing the resultant of the pressures effective on said movable member, and means for controlling the pressure within said rebalancing chamber and effective on said movable member for rebalancing, said controlling means including means for supplying fluid to said rebalancing chamber through a flow restricting member, and means controlled by the movement of said movable member for controlling the discharge from said rebalancing chamber of the supplied fluid.

6. A fluid pressure responsive unit including an enclosing casing, a movable member within said casing and having a flat pressure control surface, means for applying a force against one side of said movable member, means for applying a force against the other side of said movable member, and additional means for applying a force against said other side of said movable member for balancing the difference between the forces applied by said first two means, said additional means including a balancing chamber bounded in part by said movable member, means for supplying fluid to said chamber through a flow restricting member, and means including a fixedly mounted discharge member carried by said casing and having a discharge port controlled by the spacing of said surface of said movable member with respect to said port for controlling the discharge from said chamber of the supplied fluid.

7. A differential pressure unit including an enclosing casing, a movable member within said casing and connected to said casing by an extensible wall, said movable member having a flat pressure controlling surface, means for applying fluid pressure against one side of said movable member and inside said extensible wall, means for applying fluid pressure against a corresponding area on the other side of said movable member and outside said extensible wall, and balancing means for applying a balancing fluid pressure against another portion of said other side of said movable member for balancing the difference of the pressures applied by said other means, said balancing means including a chamber bounded in part by said movable member, means for supplying fluid to said chamber through a flow restricting member, and means including a fixedly mounted discharge member supported by said casing and having a discharge port controlled by the spacing of the pressure controlling surface of said movable member with respect to said port for controlling the discharge from said chamber of the supplied fluid.

8. A fluid pressure unit including an enclosing casing, a movable member within said casing and having a flat pressure controlling surface, means for applying a force against said movable member, and balancing means for applying a balancing fluid pressure against said movable member for balancing the force applied by said first-mentioned means, said balancing means including a chamber bounded in part by said movable member, means for supplying fluid to said chamber through a flow restriction member, and means including a fixedly mounted discharge member carried by said casing and having a discharge port controlled by the spacing of said controlling surface of said movable member with respect thereto for controlling the discharge from said chamber of the supplied fluid thereby to provide within said chamber the requisite balancing pressure.

9. A fluid pressure unit including an enclosing casing, a movable member within said casing and having a flat pressure controlling surface, means for applying forces against said movable member to provide a resultant force, means for amplifying the effect of the resultant force applied against said movable member, said amplifying means including an expansible chamber bounded in part by said movable member, means for supplying fluid from a constant pressure source to said chamber through a flow restricting member, means controlled by the movement of said movable member for controlling the discharge from said chamber of the supplied fluid, said last means including a discharge member fixedly mounted in said casing and having a discharge port directly controlled by said spacing of said controlling surface with respect thereto.

10. Pressure fluid control mechanism including a balancing chamber bounded on one portion by a member movable in response to pressure, means for applying fluids at different pressures against equal areas on opposite sides of said movable member outside said chamber, a source of fluid under pressure, means for controlling the pressure conditions in said chamber for balancing including a pilot valve for controlling the supplying of fluid from said source to said chamber and the exhausting of fluid therefrom, said movable member having a flat pressure controlling surface, and means including a fixedly mounted discharge member having a discharge port for controlling the positioning of said pilot valve and controlled by the positioning of said controlling surface with respect to said discharge port.

CHARLES H. THOMPSON.
COLEMAN B. MOORE.